United States Patent
Takeuchi (10) Patent No.: US 7,411,884 B2
(45) Date of Patent: Aug. 12, 2008

(54) OPTICAL SYSTEM WITH OBJECTIVE LENS HAVING DIFFRACTION STRUCTURE

(75) Inventor: Shuichi Takeuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 549 days.

(21) Appl. No.: 10/643,899

(22) Filed: Aug. 20, 2003

(65) Prior Publication Data

US 2004/0037204 A1 Feb. 26, 2004

(30) Foreign Application Priority Data

Aug. 21, 2002 (JP) ............................. 2002-240517

(51) Int. Cl.
G11B 7/135 (2006.01)
(52) U.S. Cl. .................................. 369/112.08
(58) Field of Classification Search ................ None
See application file for complete search history.

(56) References Cited

U.S. PATENT DOCUMENTS

| | | | | |
|---|---|---|---|---|
| 4,965,785 A * | 10/1990 | Tadokoro et al. | ........ | 369/112.24 |
| 5,978,140 A | 11/1999 | Maruyama | | |
| 5,986,995 A * | 11/1999 | He et al. | ........ | 369/112.08 |
| 6,118,594 A | 9/2000 | Maruyama | | |
| 6,118,597 A * | 9/2000 | Maruyama | ........ | 359/743 |
| 6,285,645 B1 * | 9/2001 | Shimozono | ........ | 369/112.24 |
| 6,366,542 B1 * | 4/2002 | Kojima et al. | ........ | 369/112.01 |
| 6,480,344 B1 | 11/2002 | Maruyama | | |
| 6,515,955 B2 | 2/2003 | Takeuchi | | |
| 6,556,534 B2 * | 4/2003 | Shimozono | ........ | 369/112.26 |
| 6,594,222 B2 | 7/2003 | Maruyama | | |
| 6,671,247 B1 * | 12/2003 | Arai et al. | ........ | 369/112.01 |
| 6,728,172 B2 * | 4/2004 | Ikenaka et al. | ........ | 369/44.23 |
| 6,819,646 B1 * | 11/2004 | Kitaoka et al. | ........ | 369/112.01 |
| 2001/0019528 A1 * | 9/2001 | Shiono et al. | ........ | 369/112.08 |
| 2002/0181353 A1 * | 12/2002 | Katayama | ........ | 369/112.08 |
| 2003/0072246 A1 * | 4/2003 | Nishiwaki et al. | ........ | 369/112.26 |
| 2003/0076595 A1 * | 4/2003 | Ikenaka et al. | ........ | 359/571 |
| 2003/0214898 A1 * | 11/2003 | Ogata et al. | ........ | 369/112.24 |

FOREIGN PATENT DOCUMENTS

JP 2001-249273 9/2001
JP 2004265524 A * 9/2004

OTHER PUBLICATIONS

English language abstract for JP 2004265524 A.*

* cited by examiner

Primary Examiner—Joseph Feild
Assistant Examiner—Nathan Danielsen
(74) Attorney, Agent, or Firm—Greenblum & Bernstein, P.L.C.

(57) ABSTRACT

An optical system for an optical disc drive includes a light source, an objective lens and a collimator lens. The light source emits first and second light beams. The first light beam is for reproducing data from a digital versatile disc while the second light beam is for a compact disc. The objective lens is provided with a diffraction structure which is designed to focus the first light beam on a recording layer of the digital versatile disc and the second light beam on a recording layer of the compact disc. The collimator lens is disposed between the light source and the objective lens. The collimator lens adjusts the diverging/converging angle of the first and second light beams entering the objective lens. The change in spherical aberration of the first light beam caused by wavelength deviation from a design wavelength due to individual specificity of the light source is corrected by adjusting the diverging/converging angle of the first light beam emerging from the collimator lens.

14 Claims, 5 Drawing Sheets

OPTICAL SYSTEM WITH OBJECTIVE LENS HAVING DIFFRACTION STRUCTURE

BACKGROUND OF THE INVENTION

The present invention relates to an optical system for an optical disc drive handling different types of optical discs having protective layers of different thickness.

There are several types of optical discs such as a digital versatile disc and a compact disc. The thickness of the protective layers, i.e., the transparent substrate covering a recording layer of the optical disc, depends on the type of the optical disc. For example, the protective layer of the compact disc (CD) is 1.20 mm thick while that of the digital versatile disc (DVD) is 0.60 mm thick. The protective layers having different thickness cause spherical aberrations of different amount. Therefore, an optical system for an optical disc drive that handles different types of optical discs should be designed by taking into account the difference of the spherical aberrations between each type of optical disc.

Since the recording density of the digital versatile disc is much higher than that of the compact disc, size of the beam spot to be formed on the digital versatile disc is required to be much smaller than that for the compact disc. The difference between the beam spot sizes requires the optical disc drive to utilize shorter wavelength laser beam for the digital versatile disc, i.e., 635-665 nm, than for the compact disc, i.e., 780-830 nm, since the beam spot size can be made smaller as the wavelength decreases.

Recently, it is proposed to employ an objective lens provided with a diffraction structure for the optical system of the optical drive handling different types of optical disc. The diffraction structure is a large number of concentric ring-shaped steps and converges each of the laser beams of different wavelengths onto the recording layer of the corresponding optical disc.

The diffraction structure is configured so that the spherical aberration generated thereby varies in accordance with the wavelength of the entering laser beam. In other words, the diffraction structure is designed so as to have wavelength dependency.

The spherical aberration caused by the objective lens provided with the diffraction structure mentioned above increases/decreases as the wavelength of the laser beam passed therethrough changes, and cancels the increase/decrease of the spherical aberration caused by the difference of the protective layer thickness of the optical disc to be handled. As a result, the optical system can form a beam spot of a desired size on the recording layer of each type of the optical disc.

Recently, a large amount of the objective lenses are made of plastic in order to reduce the cost. The spherical aberration caused by the plastic lens has a temperature dependency. That is, the spherical aberration varies with the temperature of the plastic lens since shape and refraction index of the lens changes as the temperature of the lens increases or decreases. Accordingly, if a plastic lens is employed for the objective lens, the lens should be designed by also taking into account the temperature dependency of the spherical aberration.

However, if the diffraction structure mentioned above is also designed to suppress the temperature dependency of the spherical aberration, both of the acceptable range of the laser beam wavelength and the acceptable range of the objective lens temperature become significantly restricted. The narrow wavelength range does not allow large wavelength deviation of the laser beam from the design wavelength and forces the use of high-end laser sources which are costly. The narrow temperature range restricts the environment in which the optical disc drive can be operated.

Therefore, there is a need for an optical system for an optical disc drive that handles different types of optical discs, which optical system is capable of correcting spherical aberration caused by the protection layer of the optical disc while allowing the laser beam wavelength deviating from the design wavelength.

There is also a need for an optical system for an optical disc drive that handles different types of optical discs, which optical system is hardly affected by temperature change even if plastic lens is employed as an objective lens thereof.

SUMMARY OF THE INVENTION

The present invention is advantageous in that an optical system and an objective lens thereof is provided that satisfies at least one of the above mentioned needs.

According to an aspect of the invention, an optical system for an optical disc drive is provided that includes a light source, an objective lens and a collimator lens. The light source emits first and second light beams which are utilized for recording and/or reproducing data to/from first and second optical discs, respectively. The second optical disc has a thicker protective layer and lower recording density than the first optical disc. The objective lens is provided with a diffraction structure which is designed to focus the first light beam on a recording layer of the first optical disc and the second light beam on a recording layer of the second optical disc. The collimator lens is disposed between the light source and the objective lens. The collimator lens adjusts the diverging/converging angle of the first and second light beams entering the objective lens. The change in spherical aberration of the first light beam caused by wavelength deviation from a design wavelength due to individual specificity of the light source is corrected by adjusting the diverging/converging angle of the first light beam emerging from the collimator lens.

Optionally, the diffraction structure is designed so that change in spherical aberration caused by wavelength variations of the first and second light beams due to temperature variation of the light source compensate for change in spherical aberration caused by temperature variation of the objective lens.

Optionally, the diffraction structure is designed so that change in spherical aberration caused by the objective lens in accordance with wavelength variation of the first light beam is generated substantially only by third-order spherical aberration. For example, the diffraction structure is designed so that change in fifth or higher order component of the spherical aberration caused by the objective lens in accordance with wavelength variation of the first light beam is either less than one fifth of the third-order component thereof or less than 0.0005 λrms/nm.

Optionally, the light source includes first and second light emitting elements for generating the first and second light beams, respectively, and the first and second light emitting elements are integrally formed.

Optionally, the diverging/converging angle of the first light beam is adjusted so as to minimize spherical aberration of the first light converged onto the recording layer of the first optical disc.

Optionally, the collimator lens is located between first and second optimum positions. Note that the spherical aberration of the first light beam converged onto the recording layer of the first optical disc is minimized when the collimator lens is located at the first optimum position, and the spherical aberration of the second light beam converged onto the recording layer of the second optical is minimized when the collimator lens is located at the second optimum position.

Optionally, the objective lens has a numerical aperture for the first light beam not less than 0.63.

According to another aspect of the invention, an optical system for an optical disc drive is provided that includes first and second light sources, an objective lens and, first and second collimator lenses. The first and second light sources emit first and second light beams, respectively. The first and second light beams are utilized for utilized for recording and/or reproducing data to to/from first and second optical discs, respectively, the second optical disc having a thicker protective layer and lower recording density than the first optical disc. The objective lens is provided with a diffraction structure which is designed to focus the first laser beam on a recording layer of the first optical disc and the second laser beam on a recording layer of the second optical disc. The first and second collimator lenses are disposed between the objective lens and the first and second light sources, respectively, so as to adjust diverging/converging angles of the first and second light beams entering the objective lens. The first and second collimator lenses are located so as to respectively correct change in spherical aberration of the first and second light beams caused by wavelength deviations from design wavelengths of the first and second light beams due to individual specificity of the first and second light sources.

Optionally, the optical system described above may further include an optical element disposed between the objective lens and the first and second collimator lenses, which optical element combines optical paths of the first and second light beams passed through the first and second collimator lenses.

According to still another aspect of the invention there is provided an optical system for an optical disc drive arranged to handle a first optical disc and a second optical disc by first and second light beams having different wavelengths to each other. The second optical disc has a thicker protective layer and lower recording density than the first optical disc. The optical system includes an objective lens provided with a diffraction structure which is designed so that the first and second light beams respectively handle the first optical disc and the second optical disc. The diffraction structure is also designed so that change in spherical aberration caused by the objective lens in accordance with wavelength variation of the first light beam is generated substantially by third-order spherical aberration only.

According to another aspect of the invention, there is provided an objective lens for an optical system of an optical disc drive. The optical disc drive is arranged to handle a first optical disc and a second optical disc by first and second light beams having different wavelengths to each other. The second optical disc has a thicker protective layer and lower recording density than the first optical disc. The objective lens is provided with a diffraction structure designed so that the first and second light beams respectively handle the first optical disc and the second optical disc and so that change in spherical aberration caused by the objective lens in accordance with wavelength variation of the first light beam is generated substantially by third-order spherical aberration only.

DETAILED DESCRIPTION OF THE EMBODIMENTS

Hereinafter, an optical system for an optical disc drive according to an embodiment of the present invention will be described with reference to the accompanying drawings.

Figure 1:
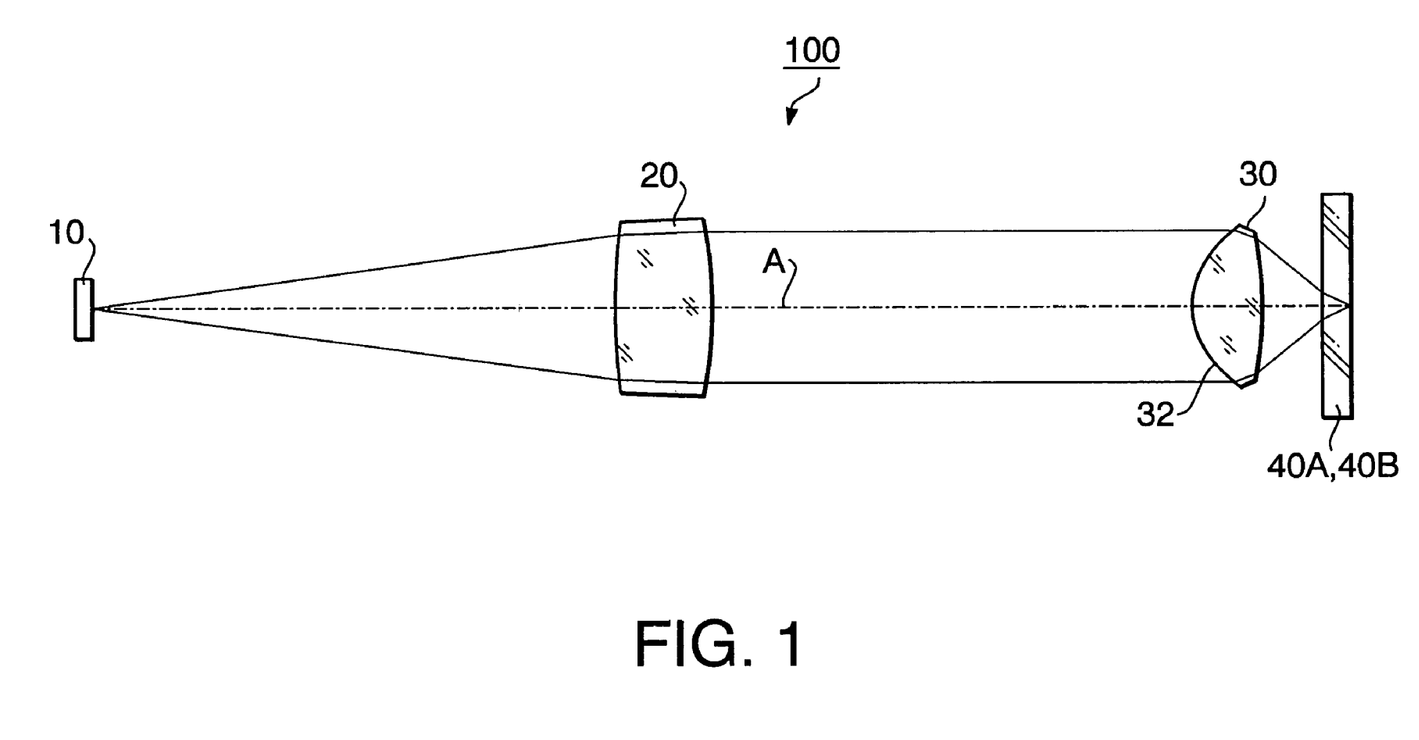
FIG. 1 schematically illustrates the optical system according to the embodiment of the invention.

FIG. 1 schematically illustrates the optical system 100 according to the embodiment of the invention. The optical system 100 is designed for an optical disk drive that is capable of recording and/or reproducing data to/from a first optical disc 40A having high recording density and a thin protective layer and a second optical disc 40B having lower recording density and thicker protective layer compared to the first optical disc 40A. Typical example of the first optical disc 40A is a digital versatile disc (DVD) and that of the second optical disc 40B is a compact disc (CD), including CD-recordable (CD-R), CD-rewritable (CD-RW), CD-read only memory (CD-ROM), and CD-digital audio (CD-DA).

The optical system 100 includes a light source 10, a collimator lens 20, and an objective lens 30.

The light source 10 has a single silicon substrate provided with two different types of active layers which emit first and second laser beams, respectively. The active layers are formed such that the light emitting points of the first and second laser beams are spaced apart from each other by about 100 μm.

The first laser beam is utilized for recording and/or reproducing data to/from the first optical disc 40A. Since the first optical disc 40A has a high recording density, the first laser beam has a short wavelength in order to form a small beam spot on the recording layer of the first optical disc 40A. On the contrary, the second laser beam is utilized to handle the second optical disc 40B. The second laser beam has a longer wavelength than the first laser beam since the recording density of the second optical disc 40B is lower than that of the first optical disc 40B and the required beam spot size is larger than that of the first laser beam.

The collimator lens 20 is placed between the light source 10 and the objective lens 30 so that the first and second laser beams emitted from the light source 10 pass therethrough. The collimator lens 20 converts the first and second laser beams into nearly parallel light beams. That is, the first and second laser beams passed through the collimator lens 20 and entering the objective lens 30 are not absolute parallel light beams but slightly diverging or converging light beams.

The objective lens 30 is a single double-convex plastic lens both of which surfaces are aspheric. The first and second light beams are converged by the objective lens 30 onto the recording layer of the first and second optical discs 40A and 40B, respectively.

Figure 2A:
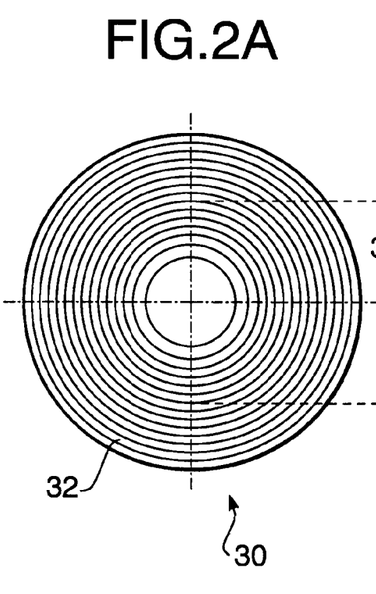
FIGS. 2A and 2B show a front view and a cross sectional view of an objective lens of the optical system shown in FIG. 1, respectively.
Figures 2B, 2C:
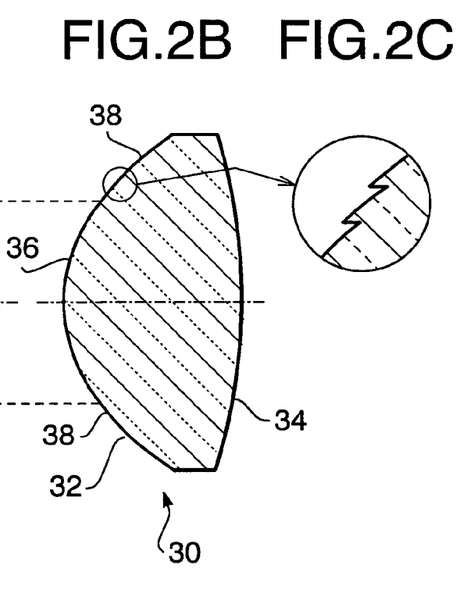
FIG. 2C is a partially enlarged view of the objective lens shown in FIG. 2B.

FIGS. 2A and 2B are a front view and a cross sectional view of the objective lens 30, respectively and FIG. 2C is a partially enlarged view of the objective lens 30 shown in FIG. 2B. The objective lens 30 has a first surface 32 facing the light source 10 and a second surface 34 directed toward the optical disc (40A or 40B) to be handled. A diffractive structure is formed on the first surface 32 of the objective lens 10. The diffractive structure includes a plurality of concentric ring-shaped steps as shown in FIGS. 2A and 2C. The second surface 34 is formed as a continuous surface without steps.

Spherical aberrations occur when the first and second laser beams pass through the protective layer of the first and second optical discs 40A and 40B. The amount of the spherical aberration shifts toward overcorrected state as the thickness of the protective layer increases. As previously mentioned, the thickness of the protective layer is different between the first and second optical discs 40A and 40B. Thus, the spherical aberration caused by the protective layer is different between the first and second optical discs 40A and 40B.

The diffraction structure of the objective lens 30 is designed such that spherical aberration caused by the objective lens 30 has wavelength dependency. More specifically, the diffraction structure is designed such that the change in the spherical aberration caused by the difference of the protective layer thickness between the first and second optical discs 40A and 40B is compensated by the change in the spherical aberration caused by the wavelength difference between the first and second laser beams.

As indicated in FIG. 2B, the diffraction structure has two areas, a middle area 36 and a peripheral area 38 surrounding the middle area 36. Both the first and second laser beams are irradiated on both the middle area 36 and the peripheral area 38.

The diffraction structure is formed such that both the middle area 36 and the peripheral area 38 converge the first laser beam passed therethrough to form a beam spot of an appropriate size on the recording layer of the first optical disc 40A. The diffraction structure is also designed so that only the portion of second laser beam passed through the middle area 36 forms a beam spot of an appropriate size on the recording layer of the second optical disc 40B while the remaining portion passed through the peripheral area 38 is diffused, for example, and hence does not contribute to form the beam spot.

In other words, the diffraction structure is formed such that the numerical aperture NA of the objective lens 30 for the second laser beam is defined by the middle portion 36 while that for the first laser beam is defined by the peripheral portion 38. The numerical aperture NA for the first laser beam is defined large enough (not less than 0.63, for example) to allow the first laser beam to form a beam spot sufficiently small for recording and/or reproducing data to/from the first optical disc 40A, which has higher recording density than the second optical disc 40B. Further, since the effective numerical aperture NA of the objective lens 30 for the second laser beam is smaller than that for the first laser beam, the second laser beam forms a beam spot of a relatively large size that is suitable for handling the second optical disc 40B.

The diffraction structure at the middle area 36 of the objective lens 30 is designed such that the spherical aberration caused by the objective lens 30 shifts toward undercorrected state as the wavelength of the light beam increases. Thus, the change in the spherical aberration caused by the decrease in the thickness of the protective layer of the optical disc can be canceled by increasing the wavelength of the laser beam.

The optical system 100 is configured such that the temperature dependency and the wavelength dependency of the spherical aberration thereof is reduced with the aid of the objective lens 30. That is, the diffraction structure of the objective lens 30 generates spherical aberration that cancels change in the spherical aberration of the optical system 100 caused by temperature variation and thereby reduces the temperature dependency of the optical system 100. Further, the wavelength dependency of the spherical aberration of the optical system 100, or the change in the spherical aberration of the optical system 100 caused by the wavelength variation due to individual specificity of the light sources 10, is reduced by adjusting the diverging/converging angle of the laser beams entering the objective lens 30.

It should be noted that the effect of the spherical aberration on the beam spot formed on the recording medium of the optical disc increases with increase of the NA of the laser beam passing through the objective lens 30. Therefore, the optical system 100 of the present embodiment is configured so as to reduce both of the temperature and wavelength dependencies of the spherical aberration when the first laser beam is converged onto the first optical disc 40A.

The spherical aberration caused by the objective lens shifts toward overcorrected state as the temperature of the objective lens increases. The wavelength of the laser beam emitted from the laser source 10 also increases with the temperature thereof at a rate of 0.2 nm/° C. For example, if the temperature of the light source 10 increases for 40° C, the wavelength of the laser beam increases for 8 nm.

Taking the above into account, the diffraction structure of the peripheral area 38 of the objective lens 30 is designed so as to converge the first laser beam onto the recording layer of the first optical disc 40A and such that the spherical aberration caused by the objective lens shifts toward the undercorrected state as the wavelength of the laser beam increases. By designing the diffraction structure as above, the change in the spherical aberration of the objective lens 30 caused by the temperature variation of the objective lens 30 can be canceled by the wavelength increase of the laser beam which is caused by the temperature change of the light source.

The peripheral area 38 of the diffraction structure is also designed such that the spherical aberration introduced into the first laser beam, passing through both the middle area 36 and the peripheral area 38 of the diffraction structure to form a beam spot on the recording medium of the optical disc, changes mainly in the third-order component thereof when wavelength of the first laser beam varies. More specifically, the diffraction structure is designed such that the change of the spherical aberration of the other order components, i.e., the fifth or higher order components, are either less than 1/5 of the third-order component or less than 0.0005 $\lambda$rms/nm, and hence negligible.

It should be noted that it is mainly the third component that contribute to the change of spherical aberration that occurs as the diverging/converging angle of the light beam entering the objective lens 30 is changed. Accordingly, the objective lens 30 designed to have the wavelength dependency as mentioned above allows correction of the spherical aberration change, which is cause by the wavelength variation of the laser beam, by adjusting the diverging/converging angle of the laser beam entering the objective lens 30.

The wavelengths of the first and second laser beams may slightly vary between individual light sources 10 due to individual specificity thereof. In the optical system 100 according to the present embodiment, the change in the spherical aberration of the objective lens caused by the wavelength deviation of the first and second laser beams due the individual specificity of the light source 10 is corrected by adjusting the diverging/converging angles of the first and second laser beams entering the objective lens 30. The diverging/converging angles of the first and second laser beams are adjusted by changing the position of the collimator lens 20 along the optical axis A of the optical system 100. Since the change in the spherical aberration of the objective lens caused by the change of the diverging/converging angle of the laser beam is also mainly caused by the third component of the spherical aberration, the change of the spherical aberration caused by the wavelength deviation of the laser beam can be well corrected by the above mention method.

Note that the collimator lens 20 may be secured, for example, at a location where the spherical aberration of the first (or second) laser beam focused on the recording layer of the first optical disc 40A (or the second optical disc 40B) is most reduced and hence the beam spot formed on the recording layer of the first optical disc 40A (or the second optical disc 40B) is minimized, which location will be referred to hereinafter as an optimum position for the first (or second) laser beam. Alternatively, the collimator lens 20 may be secured somewhere between optimum positions for the first and second laser beams.

Typically, the wavelength deviation from the design wavelength becomes clear at the time of assembling the optical system 100. Thus, the location of the collimator lens 20 is determined at the time of assembling the optical system 100 and the collimator lens 20 is fixed at the location determined. After the assembling is completed, it is normally not necessary to readjust the position of the collimator lens 20.

It should be noted that conventional objective lenses are designed taking into account the temperature dependency of the spherical aberration generated while also giving consideration to the balance between the temperature and wavelength dependencies of the spherical aberration. As a result, the peripheral area of the diffraction structure of the conventional objective lens, which peripheral area is designed to converge only the first laser beam, tends to under correct the spherical aberration caused by the temperature dependency.

In the present embodiment, the wavelength dependency of the spherical aberration, or the change of the spherical aberration caused by the wavelength variation of the laser beam due to the individual specificity thereof, is corrected by adjusting the diverging/converging angle of the laser beam entering the objective lens 30. Accordingly, the objective lens 30 can be designed to reduce the temperature dependency thereof without giving consideration to the balance with the wavelength dependency thereof.

Now, examples of specific data of the optical system according to the embodiment of the invention will be described. Note that the optical systems in the following examples are designed to handle an optical disc (first optical disc 40A) of which protective layer is 0.6 mm thick and an optical disc (second optical disc 40B) of which protective layer is 1.2 mm thick.

EXAMPLE 1

Tables 1 and 2 show a first example of the specific numerical configuration of the optical system 100. In Table 1, the design wavelength is the wavelength of the laser beam that is most appropriate for recording and/or reproducing data to/from the optical disc. $f_{OBL}$ and $f_{CL}$ are the focal length of the objective lens 30 and the collimator lens 20, respectively, and NA is the numerical aperture of the objective lens at the image side. Note that, when the wavelengths of first and second laser beams are both the design wavelength, the optimum position of the collimator lens 20 is 11.19 mm from the light source 10.

TABLE 1

|  | First Optical disc | Second Optical disc |
|---|---|---|
| Design wavelength | 655 nm | 783 nm |
| $f_{OBL}$ | 2.40 mm | 2.42 mm |
| $f_{CL}$ | 12.00 mm | 12.08 mm |
| NA (Image Side) | 0.65 | 0.50 |

TABLE 2

| Surface Number | r | d | n | υ |
|---|---|---|---|---|
| #0 | — | 11.19 | | |
| #1 | 15.000 | 2.00 | 1.5163 | 64.2 |
| #2 | −10.000 | 10.00 | | |
| #3 | Diffraction Surface | 1.40 | 1.5436 | 55.7 |
| #4 | −6.550 | 1.23 | | |
| #5 | ∞ | 0.60 | 1.5855 | 29.9 |
| #6 | ∞ | — | | |

Figure 3A:
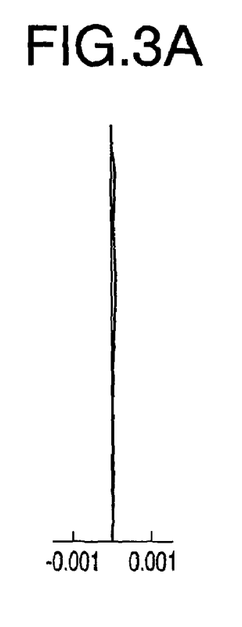
FIG. 3A shows a spherical aberration that occurs as a first laser beam of design wavelength passes through the first exemplary optical system and a protective layer of a first optical disc.
Figure 3B:
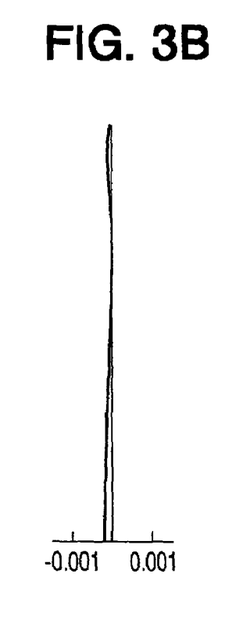
FIG. 3B shows a spherical aberration that occurs as a second laser beam of design wavelength passes through the first exemplary optical system and a protective layer of a second optical disc.

FIG. 3A shows the spherical aberration that occurs as the first laser beam of the design wavelength passes through the optical system 100 and the protective layer of the first optical disc 40A to record or reproduce data. FIG. 3B shows the spherical aberration that occurs as the second laser beam of the design wavelength passes through the optical system 100 and the protective layer of the second optical disc 40B to record or reproduce data. In FIGS. 3A and 3B, the vertical axes indicate the ray heights at the objective lens normalized by the effective beam diameter thereat of the first and second laser beams, respectively. The horizontal axes in FIGS. 3A and 3B indicate the amount of spherical aberration in millimeter (mm). As can be understood from FIGS. 3A and 3B, the spherical aberrations are well reduced when the wavelengths of the first and second laser beams coincide with respective design wavelengths.

In Table 2, surface number 0 indicates the light emitting point of the light source 10, and surface numbers 1 and 2 indicate the surfaces of the collimator lens 20 at the light source side and the objective lens side, respectively. Surface numbers 3 and 4 indicate the surfaces of the objective lens 30 at the collimator lens side and the optical disc side, respectively. Further, surface numbers 5 and 6 indicate, respectively, the outer and inner surfaces of the protective layer of the optical disc (40A, 40B). r is the radius of curvature of the surfaces represented in millimeter (mm), and d is the distance to the next surface also represented in millimeter (mm). n indicates the refractive index for the d line (588 nm), and ν is the Abbe number for the d line.

The second surface of the collimator lens 20 (surface number 2) and the second surface of the objective lens 30 (surface number 4) are aspheric. Further, the first surface of the objective lens 30 (surface number 3) has an aspheric base curve, which is the shape of the surface before forming the diffraction structure.

Each of the above-mentioned aspheric surfaces can be represented by the following equation:

$$X(h) = \frac{Ch^2}{1 + \sqrt{1 - (K+1)C^2h^2}} + A_4h^4 + A_6h^6 + A_8h^8 + A_{10}h^{10} + A_{12}h^{12}$$

In the equation above, X(h) is a sag, that is, a distance of a curve from a tangential plane, which is defined at an intersection point of the optical axis, at a point on the surface where the height from the optical axis is h. Symbol C is a curvature (1/r) of the vertex of the surface, K is a conic constant, $A_4$, $A_6$, $A_8$, $A_{10}$ and $A_{12}$ are aspheric surface coefficients of fourth, sixth, eighth, tenth and twelfth orders, respectively.

The conic constant and the aspheric surface coefficients of each aspheric surface are shown in Table 3.

TABLE 3

| Surface Number | #2 | #3 (h < 1.20) | #3 (h > 1.20) | #4 |
|---|---|---|---|---|
| r | −10.000 | 1.490 | 1.530 | −6.550 |
| κ | 0.000 | −0.500 | −0.500 | 0.000 |
| A04 | $3.57000 \times 10^{-2}$ | $-1.01720 \times 10^{-2}$ | $-2.73720 \times 10^{-3}$ | $2.01600 \times 10^{-2}$ |
| A06 | $0.00000 \times 10^{+0}$ | $-1.89400 \times 10^{-3}$ | $-1.03600 \times 10^{-3}$ | $4.02700 \times 10^{-3}$ |
| A08 | $0.00000 \times 10^{+0}$ | $-3.93700 \times 10^{-4}$ | $-6.00000 \times 10^{-4}$ | $-6.69000 \times 10^{-3}$ |
| A10 | $0.00000 \times 10^{+0}$ | $2.49600 \times 10^{-4}$ | $4.43000 \times 10^{-4}$ | $2.13800 \times 10^{-3}$ |
| A12 | $0.00000 \times 10^{+0}$ | $-1.73400 \times 10^{-4}$ | $-2.50000 \times 10^{-4}$ | $-2.50000 \times 10^{-4}$ |

Note that the shape of the aspheric surface of the first surface of the objective lens 30 (surface number 3) differs between the middle portion (h<1.20) and the peripheral portion (h>1.20) thereof.

The diffractive structure formed on the first surface of the objective lens 30 (surface number 3) is represented by the additional optical path length defined by the following equation:

$$\phi(h) = (P_2h^2 + P_4h^4 + P_6h^6 + \ldots) \times \lambda$$

The additional optical path length is the difference between the optical path length of a ray diffracted by the diffractive structure at a height h from the optical axis and the optical path length of a virtual ray passing the objective lens at the same position but not diffracted by the diffraction structure. In the equation above, h is a height from the optical axis and k is a wavelength of an incident laser beam. The coefficients $P_2$, $P_4$, $P_6$, ... are additional optical path length coefficients having the value shown in Table 4.

TABLE 4

| Surface Number | #3 (h < 1.20) | #3 (h > 1.20) |
|---|---|---|
| P02 | $1.20000 \times 10^{+0}$ | $-6.04100 \times 10^{+0}$ |
| P04 | $-6.23800 \times 10^{+0}$ | $-6.78000 \times 10^{-1}$ |
| P06 | $-1.20000 \times 10^{+0}$ | $-1.25600 \times 10^{-1}$ |
| P08 | $0.00000 \times 10^{+0}$ | $0.00000 \times 10^{+0}$ |
| P10 | $0.00000 \times 10^{+0}$ | $0.00000 \times 10^{+0}$ |
| P12 | $0.00000 \times 10^{+0}$ | $0.00000 \times 10^{+0}$ |

Tables 5 and 6 show, respectively, the wavelength and the temperature dependencies of the spherical aberration that occurs when the first laser beam passes through the objective lens 30 of the present example. Note that, in Table 6, it is assumed that the wavelength of the first laser beam changes with the temperature at a rate of 0.2 nm/° C. Further, SA3, SA5, SA7 and SA9 represent, respectively, the third, fifth, seventh and ninth orders of the spherical aberration.

TABLE 5

| Wavelength Dependecy | |
|---|---|
| SA3 | 0.0031 λ rms/nm |
| SA5 | 0.0004 λ rms/nm |
| SA7 | 0.0004 λ rms/nm |
| SA9 | 0.0003 λ rms/nm |

TABLE 6

| Temperature Dependency | |
|---|---|
| SA3 | 0.0030 λ rms/10° C. |
| SA5 | 0.0027 λ rms/10° C. |
| SA7 | 0.0007 λ rms/10° C. |
| SA9 | 0.0007 λ rms/10° C. |

It is now assumed that the wavelength of the first laser beam is 665 nm, which deviates from the design wavelength for Δλ=+10 nm, and the wavelength of the second laser beam is 790 nm, which deviates from the design wavelength for Δλ=+7 nm. In this case, the optimum position of the collimator lens 20 for the first laser beam, i.e., where the spherical aberration becomes minimum for the first laser beam, is 11.49 mm from the light source 10. The optimum position of the collimator lens 20 for the second laser beam is 11.44 mm from the light source 10.

Table 7 shows the amount of the spherical aberration for the first laser beam (λ=665 nm) when the collimator lens 20 is located at 11.49 mm and 11.19 mm from the light source 10. Further, Table 8 shows the amount of the spherical aberration for the second laser beam (λ=790 nm) when the collimator lens is located at 11.49 mm, 11.44 mm and 11.19 mm.

TABLE 7

| Distance | 11.49 mm | 11.19 mm |
| --- | --- | --- |
| SA3 | 0.000 λ rms | 0.031 λ rms |
| SA5 | 0.004 λ rms | 0.003 λ rms |
| SA7 | 0.004 λ rms | 0.004 λ rms |
| SA9 | 0.004 λ rms | 0.003 λ rms |
| Total | 0.007 λ rms | 0.031 λ rms |

TABLE 8

| Distance | 11.49 mm | 11.44 mm | 11.19 mm |
| --- | --- | --- | --- |
| SA3 | 0.002 λ rms | 0.000 λ rms | 0.011 λ rms |
| SA5 | 0.001 λ rms | 0.001 λ rms | 0.001 λ rms |
| SA7 | 0.000 λ rms | 0.000 λ rms | 0.000 λ rms |
| SA9 | 0.000 λ rms | 0.000 λ rms | 0.000 λ rms |
| Total | 0.002 λ rms | 0.001 λ rms | 0.011 λ rms |

As can be understood from Tables 7 and 8, the spherical aberration for the second laser beam does not vary much with the position of the collimator lens 20 while that for the first laser beam changes significantly. Accordingly, in the present example, the collimator lens 20 is located at the optimum position of the first laser beam, i.e., 11.49 mm from the light source 10.

Note that if the spherical aberration for the second laser beam increases significantly by locating the collimator lens 20 at the optimum position for the first laser beam, the collimator lens can be located somewhere between the optimum positions for the first and second laser beams (between 11.44 mm and 11.49 mm from the light source 10 in the present example) so that the spherical aberration of each of the first and second laser beams does not exceed an acceptable amount.

Figure 4A:
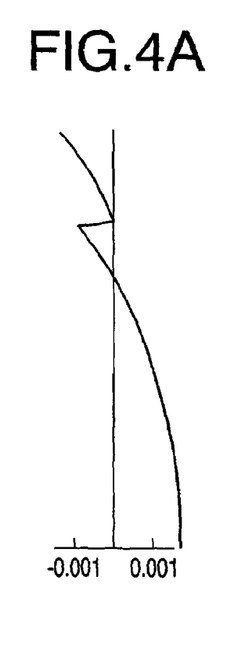
FIGS. 4A and 4B show spherical aberrations that occur as the first laser beam of 655 nm passes through the first exemplary optical system and the protective layer of the first optical disc.
Figure 4B:
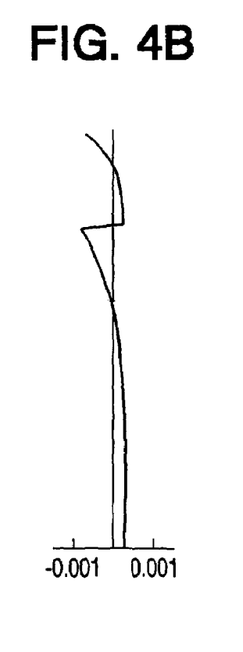

FIGS. 4A and 4B show the spherical aberrations that occur as the first laser beam of 665 nm passes through the optical system 100 and the protective layer of the first optical disc 40A to record or reproduce data. FIG. 4A shows the spherical aberration before adjusting the position of the collimator lens 20 and FIG. 4B shows the spherical aberration after optimizing the position of the collimator lens 20 as mentioned above. As can be seen in FIG. 4A, there is a significant spherical aberration since the objective lens 30 has wavelength dependency. However, the spherical aberration is well reduced by optimizing the position of the collimator lens 20, as shown in FIG. 4B. Thus, the first laser beam can form a beam spot of a sufficiently small size on the recording medium of the first optical disc 40A.

EXAMPLE 2

Tables 9 and 10 show a second example of the specific numerical configuration of the optical system 100. Note that, when the wavelengths of first and second laser beams are both the design wavelengths thereof, the optimum position of the collimator lens 20 is 11.66 mm from the light source 10.

TABLE 9

|  | First Optical Disc | Second Optical Disc |
| --- | --- | --- |
| Design Wagelength | 655 nm | 783 nm |
| $f_{OBL}$ | 2.75 | 2.77 |
| $f_{CL}$ | 16.00 | 16.11 |
| NA (Image Side) | 0.63 | 0.50 |

TABLE 10

| Surface Number | r | d | n | υ |
| --- | --- | --- | --- | --- |
| #0 | — | 14.66 |  |  |
| #1 | ∞ | 2.00 | 1.4918 | 57.4 |
| #2 | −7.83 | 10.00 |  |  |
| #3 | Diffracting Plane | 1.60 | 1.5436 | 55.7 |
| #4 | −7.73 | 1.47 |  |  |
| #5 | ∞ | 0.60 | 1.5855 | 29.9 |
| #6 | ∞ | — |  |  |

Figure 5A:
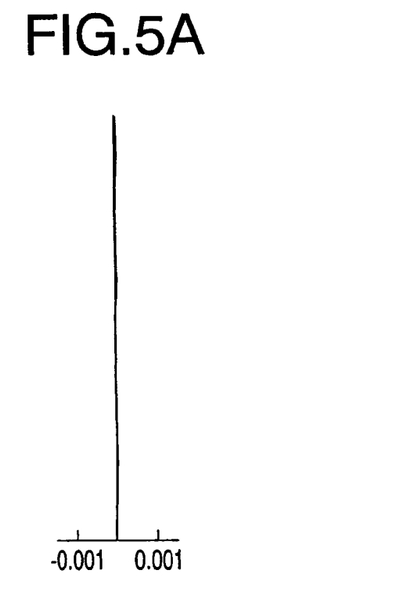
FIG. 5A shows a spherical aberration that occurs as the first laser beam of design wavelength passes through the second exemplary optical system and the protective layer of the first optical disc.
Figure 5B:
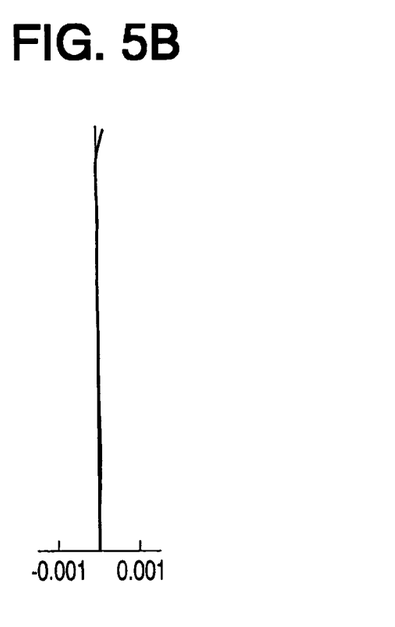
FIG. 5B shows a spherical aberration that occurs as the second laser beam of design wavelength passes through the second exemplary optical system and the protective layer of the second optical disc.

FIG. 5A shows the spherical aberration that occurs as the first laser beam of the design wavelength passes through the optical system 100 and the protective layer of the first optical disc 40A to record or reproduce data. FIG. 5B shows the spherical aberration that occurs as the second laser beam of the design wavelength passes through the optical system 100 and the protective layer of the second optical disc 40B to record or reproduce data. FIGS. 5A and 5B indicate that the spherical aberrations are well reduced by the optical system 100 according to the present example if the wavelengths of the first and second laser beams coincide with the respective design wavelengths.

In Table 10, surface number 1 indicates the light emitting point of the light source 10, and surface numbers 1 and 2 indicate the surfaces of the collimator lens 20 at the light source side and the objective lens side, respectively. Surface numbers 3 and 4 indicate the surfaces of the objective lens 30 at the collimator lens side and the optical disc side, respectively. Further, surface numbers 5 and 6 indicate, respectively, the outer and inner surfaces of the protective layer of the optical disc (40A, 40B).

As with example 1, the second surface of the collimator lens 20 (surface number 2) and the second surface of the objective lens 30 (surface number 4) are formed aspheric. Further, the first surface of the objective lens 30 (surface number 3) has also an aspheric base curve.

Table 11 shows the conic constants and the aspheric surface coefficients of each aspheric surfaces.

TABLE 11

| Surface Number | #2 | #3 (h < 1.38) | #3 (h > 1.38) | #4 |
| --- | --- | --- | --- | --- |
| r | −7.830 | 1.700 | 1.730 | −7.330 |
| κ | −0.573 | −0.500 | −0.500 | 0.000 |
| A04 | $0.00000 \times 10^{+0}$ | $-5.76000 \times 10^{-3}$ | $-2.24590 \times 10^{-3}$ | $1.52300 \times 10^{-2}$ |
| A06 | $0.00000 \times 10^{+0}$ | $-7.59000 \times 10^{-4}$ | $-5.99900 \times 10^{-4}$ | $9.83000 \times 10^{-4}$ |

TABLE 11-continued

| Surface Number | #2 | #3 (h < 1.38) | #3 (h > 1.38) | #4 |
|---|---|---|---|---|
| A08 | $0.00000 \times 10^{+0}$ | $-1.73500 \times 10^{-4}$ | $-1.76800 \times 10^{-4}$ | $-2.52500 \times 10^{-3}$ |
| A10 | $0.00000 \times 10^{+0}$ | $7.56300 \times 10^{-5}$ | $9.90000 \times 10^{-5}$ | $6.77700 \times 10^{-4}$ |
| A12 | $0.00000 \times 10^{+0}$ | $-4.26000 \times 10^{-5}$ | $-4.58600 \times 10^{-5}$ | $-6.45700 \times 10^{-5}$ |

Note that the aspheric shape of the objective lens 30 differs between the middle portion (h>1.38) and the peripheral portion (h<1.38) thereof.

Table 12 shows the additional optical path length coefficients for the diffraction structure formed on the objective lens 30 of the present example.

TABLE 12

| Surface Number | #3 (h < 1.38) | #3 (h > 1.38) |
|---|---|---|
| P02 | $1.00000 \times 10^{+0}$ | $-3.20970 \times 10^{+0}$ |
| P04 | $-3.62500 \times 10^{+0}$ | $-1.02000 \times 10^{+0}$ |
| P06 | $-5.37000 \times 10^{-1}$ | $-6.12000 \times 10^{-1}$ |
| P08 | $0.00000 \times 10^{+0}$ | $0.00000 \times 10^{+0}$ |
| P10 | $0.00000 \times 10^{+0}$ | $0.00000 \times 10^{+0}$ |
| P12 | $0.00000 \times 10^{+0}$ | $0.00000 \times 10^{+0}$ |

Tables 13 and 14 show, respectively, the wavelength and the temperature dependencies of the spherical aberration that occurs when the first laser beam passes through the objective lens 30 of the present example. Note that, in Table 14, it is assumed that the wavelength of the first laser beam changes with the temperature at a rate of 0.2 nm/° C.

TABLE 13

| | Wavelength Dependency |
|---|---|
| SA3 | 0.0034 λ rms/nm |
| SA5 | 0.0002 λ rms/nm |
| SA7 | 0.0002 λ rms/nm |
| SA9 | 0.0003 λ rms/nm |

TABLE 14

| | Temperature Dependency |
|---|---|
| SA3 | 0.0013 λ rms/10° C. |
| SA5 | 0.0019 λ rms/10° C. |
| SA7 | 0.0003 λ rms/10° C. |
| SA9 | 0.0005 λ rms/10° C. |

It is now assumed that the wavelength of the first laser beam is 645 nm, which deviates from the design wavelength for Δλ=−10 nm, and the wavelength of the second laser beam is 783 nm, which coincides with the design wavelength (Δλ=0 nm). In this case, the optimum position of the collimator lens 20 for the first laser beam is 14.15 mm from the light source 10 and 14.66 mm for the second laser beam.

Table 15 shows the amounts of the spherical aberrations for the first laser beam (λ=645 nm) and the second laser beam (λ=783 nm), respectively, for cases in which the collimator lens 20 is located at 14.15 mm and 14.66 mm from the light source 10.

TABLE 15

| Distance | 14.15 mm | 14.66 mm |
|---|---|---|
| SA3 | 0.000 λ rms | 0.035 λ rms |
| SA5 | 0.004 λ rms | 0.003 λ rms |
| SA7 | 0.003 λ rms | 0.003 λ rms |
| SA9 | 0.004 λ rms | 0.003 λ rms |
| Total | 0.006 λ rms | 0.035 λ rms |

TABLE 16

| Distance | 14.15 mm | 14.66 mm |
|---|---|---|
| SA3 | 0.016 λ rms | 0.000 λ rms |
| SA5 | 0.000 λ rms | 0.000 λ rms |
| SA7 | 0.000 λ rms | 0.000 λ rms |
| SA9 | 0.000 λ rms | 0.000 λ rms |
| Total | 0.016 λ rms | 0.000 λ rms |

As can be understood from Table 15, when the collimator lens 20 is located at the optimum position for the second laser beam (14.66 mm), a large spherical aberration of which value is 0.035 λrms occurs for the first laser beam. On the contrary, when the collimator lens 20 is located at the optimum position for the first laser beam (14.15 mm), the spherical aberration for the second laser beam does not increase much. Thus, in the present example, the collimator lens 20 may be located at the optimum position for the first laser beam (14.15 mm) so that the spherical aberrations of both of the first and second laser beams does not becomes significantly large.

However, if the collimator lens 20 is located at the optimum position for the first laser beam (i.e., 14.15 mm) and not at the optimum position for the second laser beam (i.e., 14.66 mm), spherical aberration of 0.016 arms occurs for the second laser beam. If it is desired to reduce the spherical aberration of the second laser beam less than the above-mentioned value to improve the performance of the optical disc drive for recording/reproducing data to/from the second optical disc, the collimator lens 20 may be positioned somewhere between the optimum positions for the first and second laser beams at which the spherical aberration of the second laser beam become less than the above mentioned value while the spherical aberration of the first laser beam still does not exceeds an acceptable value.

Figure 6A:
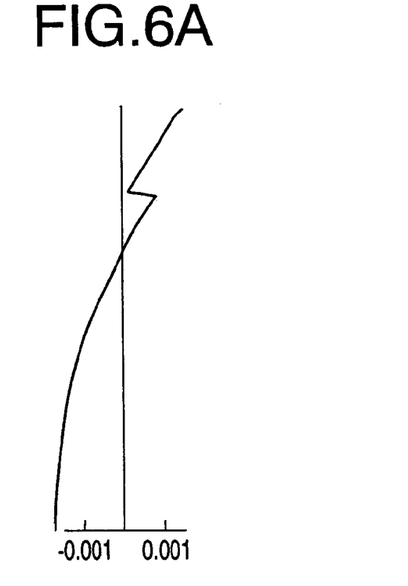
FIGS. 6A and 6B show spherical aberrations that occur as the first laser beam of 645 nm passes through the second exemplary optical system and the protective layer of the first optical disc.
Figure 6B:
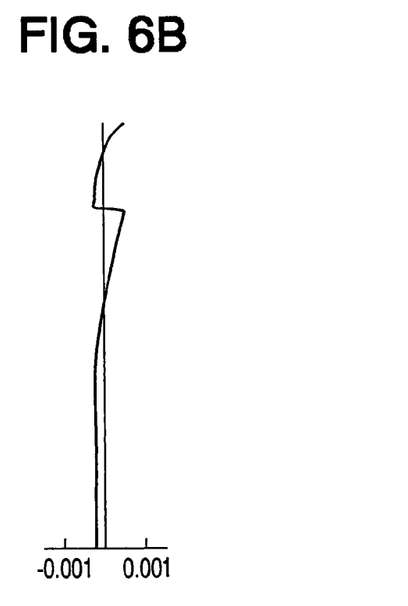

FIGS. 6A and 6B show the spherical aberrations that occur as the first laser beam of 645 nm passes through the optical system 100 and the protective layer of the first optical disc 40A to record or reproduce data. FIG. 6A shows the spherical aberration before adjusting the position of the collimator lens 20 and FIG. 6B shows the spherical aberration after optimizing the position of the collimator lens 20 as mentioned above. As can be seen in FIG. 6A, there is a significant spherical aberration since the objective lens 30 has wavelength dependency. However, the spherical aberration is well reduced by optimizing the position of the collimator lens 20, as shown in FIG. 6B. Thus, the first laser beam can form a beam spot of a sufficiently small size on the recording medium of the first optical disc 40A.

Figure 7:
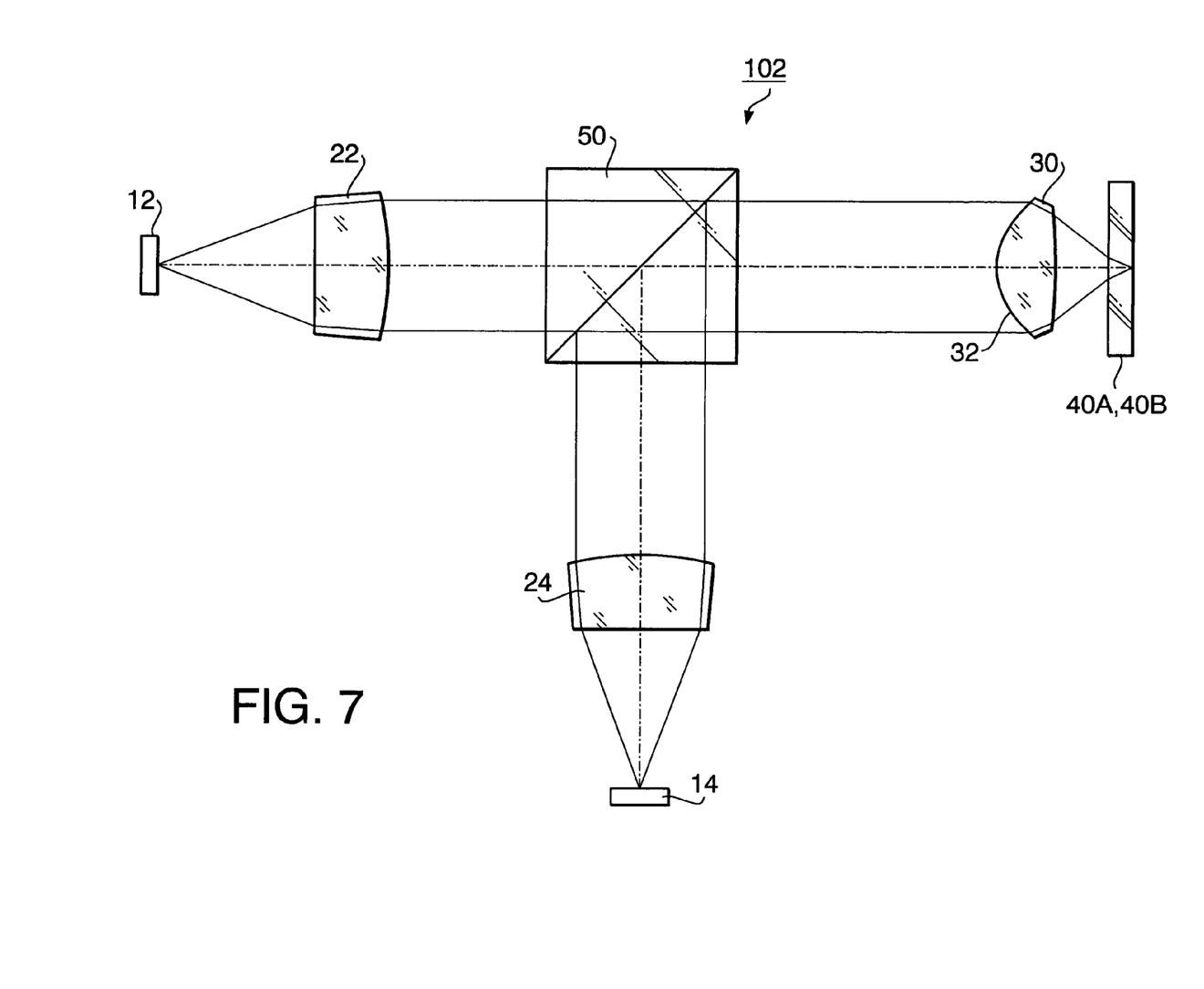
FIG. 7 shows a modification of the optical system shown in FIG. 1

FIG. 7 shows a modification of the optical system shown in FIG. 1. The modified optical system 102 is provided with a first and second light sources 12 and 14. The first light source 12 emits the first laser beam for recording/reproducing data to/from the first optical disc 40A, while the second light source 14 emits the second laser beam for handling the second optical disc 40B. The first and second laser beams emitted from respective light sources 12 and 14 pass through first and second collimator lens 22 and 24, respectively, to be converted into slightly diverging or converging light beams. Next, the first and second laser beams passes through a beam splitter 50 that combines the optical paths thereof. Then, each of the first and second laser beams passes through the objective lens 30, which is identical to that of FIG. 1, to be converged onto the recording layer of the corresponding optical disc (40A or 40B).

In this modified optical system 102, the first collimator lens 22 is located at the optimum position for the first laser beam, while the second collimator lens 24 is located at the optimum position for the second laser beam.

Note that, the beam splitter may be replaced with any type of optical elements, such as a half mirror and a prism, that can combine the optical paths of the first and second laser beams.

While the invention has been described with particular reference to its preferred embodiments, it will be understood by those skilled in the art that various changes may be made and equivalents may be substituted for elements of the preferred embodiments without departing from the invention. In addition, many modifications may be made to adapt a particular situation and material to a teaching of the present invention without departing from the essential teachings of the invention.

For example, the diverging/converging angles of the laser beams entering the objective lens 30 may be adjusted, instead of changing the position of the collimator lens 20, by changing the thickness of the collimator lens 20 at the center thereof or by changing the radius of curvature of one of the surface of the collimator lens 20. Note that the change of the thickness of the collimator lens or the radius of curvature of one of the surface thereof do not significantly affect the performance of the optical system according to embodiments of the invention since the numerical aperture NA is small.

The present disclosure relates to the subject matter contained in Japanese Patent Application No. P2002-240517, filed on Aug. 21, 2002, which is expressly incorporated herein by reference in its entirety.

What is claimed is:

1. An optical system for an optical disc drive, comprising:
a light source that emits first and second light beams, said first and second light beams utilized for recording and/or reproducing data to/from first and second optical discs, respectively, the second optical disc having a thicker protective layer and lower recording density than the first optical disc;
an objective lens provided with a diffraction structure, said diffraction structure being designed to focus said first light beam on a recording layer of the first optical disc and said second light beam on a recording layer of the second optical disc; and
a collimator lens disposed between said light source and said objective lens to adjust diverging/converging angle of said first and second light beams entering said objective lens,
wherein change in spherical aberration of said first light beam caused by wavelength deviation from a design wavelength due to individual specificity of said light source is corrected by adjusting the diverging/converging angle of said first light beam emerging from said collimator lens,
wherein said collimator lens is located between first and second optimum positions, the spherical aberration of said first light beam converged onto the recording layer of the first optical disc being minimized when said collimator lens is located at said first optimum position, the spherical aberration of said second light beam converged onto the recording layer of the second optical disc being minimized when said collimator lens is located at said second optimum position,
wherein the collimator lens is fixed at a predetermined location during assembly of the optical systems,
wherein said diffraction structure is designed so that change in spherical aberration caused by said objective lens in accordance with wavelength variation of said first light beam is generated mainly by third-order spherical aberration, and
wherein said diffraction structure is designed so that change in fifth or higher order component of the spherical aberration caused by said objective lens in accordance with wavelength variation of said first light beam is less than 0.0005 λrms/nm.

2. The optical system according to claim 1, wherein said diffraction structure is designed so that change in spherical aberration caused by wavelength variations of said first and second light beams due to temperature variation of said light source compensate for change in spherical aberration caused by temperature variation of said objective lens.

3. The optical system according to claim 1, wherein said diffraction structure is designed so that the change in fifth or higher order component of the spherical aberration caused by said objective lens in accordance with wavelength variation of said first light beam is less than one fifth of the third-order component thereof.

4. The optical system according to claim 1, wherein said light source includes first and second light emitting elements for generating said first and second light beams, respectively, said first and second light emitting elements being integrally formed.

5. The optical system according to claim 1, wherein said objective lens has a numerical aperture for said first light beam not less than 0.63.

6. An optical system for an optical disc drive, comprising:
first and second light sources emitting first and second light beams, respectively, said first and second light beams utilized for recording and/or reproducing data to to/from first and second optical discs, respectively, the second optical disc having a thicker protective layer and lower recording density than the first optical disc;
an objective lens provided with a diffraction structure, said diffraction structure being designed to focus said first laser beam on a recording layer of the first optical disc and said second laser beam on a recording layer of the second optical disc; and
first and second collimator lenses disposed between said objective lens and said first and second light sources, respectively, so as to adjust diverging/converging angles of said first and second light beams entering said objective lens;
wherein said first and second collimator lenses are located so as to respectively correct change in spherical aberration of said first and second light beams caused by wavelength deviations from design wavelengths of said first and second light beams due to individual specificity of said first and second light sources, wherein the first collimator lens is located at a first optimum position so that the spherical aberration of said first light beam converged onto the recording layer of the first optical disc is minimized, wherein the second collimator lens is located at a second optimum position so that the spherical aberration of said second light beam converged onto the recording layer of the second optical disc is minimized, wherein the first and second collimator lenses are fixed at the first and second optimum positions, respectively, during assembly of the optical system, wherein said diffraction structure is designed so that change in spherical aberration caused by said objective lens in accordance with wavelength variation of said first light beam is generated mainly by third-order spherical aberration, and wherein said diffraction structure is designed so that change in fifth or higher order component of the spherical aberration caused by said objective lens in accordance with wavelength variation of said first light beam is less than 0.0005 λrms/nm.

7. The optical system according to claim 6, further comprising an optical element disposed between said objective lens and said first and second collimator lenses, said optical element combining optical paths of said first and second light beams passed through said first and second collimator lenses.

8. The optical system according to claim 6, wherein said diffraction structure is designed so that change in spherical aberration caused by wavelength variations of said first and second light beams due to temperature variations of said first and second light sources compensate for change in spherical aberration caused by temperature variation of said objective lens.

9. The optical system according to claim 6, wherein said objective lens has a numerical aperture not less than 0.63 for said first light beam.

10. An optical system for an optical disc drive, comprising:

a light source that emits first and second light beams, said first and second light beams utilized for recording and/or reproducing data to/from first and second optical discs, respectively, the second optical disc having a thicker protective layer and lower recording density than the first optical disc;

an objective lens provided with a diffraction structure, said diffraction structure being designed to focus said first light beam on a recording layer of the first optical disc and said second light beam on a recording layer of the second optical disc; and a collimator lens disposed between said light source and said objective lens to adjust diverging/converging angle of said first and second light beams entering said objective lens, wherein change in spherical aberration of said first light beam caused by wavelength deviation from a design wavelength due to individual specificity of said light source is corrected by adjusting the diverging/converging angle of said first light beam emerging from said collimator lens, wherein the diverging/converging angle of said first light beam is adjusted so as to minimize spherical aberration of said first light converged onto the recording layer of the first optical disc, wherein the collimator lens is fixed at a predetermined location during assembly of the optical system, wherein said diffraction structure is designed so that change in spherical aberration caused by said objective lens in accordance with wavelength variation of said first light beam is generated mainly by third-order spherical aberration, and wherein said diffraction structure is designed so that change in fifth or higher order component of the spherical aberration caused by said objective lens in accordance with wavelength variation of said first light beam is less than 0.0005 λms/nm.

11. The optical system according to claim 10, wherein said diffraction structure is designed so that change in spherical aberration caused by wavelength variations of said first and second light beams due to temperature variation of said light source compensate for change in spherical aberration caused by temperature variation of said objective lens.

12. The optical system according to claim 10, wherein said diffraction structure is designed so that the change in fifth or higher order component of the spherical aberration caused by said objective lens in accordance with wavelength variation of said first light beam is less than one fifth of the third-order component thereof.

13. The optical system according to claim 10, wherein said light source includes first and second light emitting elements for generating said first and second light beams, respectively, said first and second light emitting elements being integrally formed.

14. The optical system according to claim 10, wherein said objective lens has a numerical aperture for said first light beam not less than 0.63.

* * * * *